(12) United States Patent
Song et al.

(10) Patent No.: US 11,831,275 B2
(45) Date of Patent: Nov. 28, 2023

(54) APPARATUS FOR DIAGNOSING PHOTOVOLTAIC POWER GENERATION THROUGH ANALYSIS OF POWER GENERATION TREND

(71) Applicant: DAEEUN CO. LTD., Jeju-si (KR)

(72) Inventors: Ki Taek Song, Jeju-si (KR); Cheol Song Lee, Jeju-si (KR); Kyung Rok Kim, Jeju-si (KR)

(73) Assignee: DAEEUN CO. LTD., Jeju-si (KR)

( * ) Notice: Subject to any disclaimer, the term of this patent is extended or adjusted under 35 U.S.C. 154(b) by 89 days.

(21) Appl. No.: 17/429,696

(22) PCT Filed: Dec. 9, 2019

(86) PCT No.: PCT/KR2019/017300
§ 371 (c)(1),
(2) Date: Jan. 11, 2022

(87) PCT Pub. No.: WO2020/166804
PCT Pub. Date: Aug. 20, 2020

(65) Prior Publication Data
US 2022/0149784 A1 May 12, 2022

(30) Foreign Application Priority Data
Feb. 15, 2019 (KR) .................. 10-2019-0017759

(51) Int. Cl.
*H02S 50/10* (2014.01)
*G05B 23/02* (2006.01)
*H02S 40/38* (2014.01)

(52) U.S. Cl.
CPC .......... *H02S 50/10* (2014.12); *G05B 23/0221* (2013.01); *G05B 23/0235* (2013.01); *H02S 40/38* (2014.12)

(58) Field of Classification Search
CPC ...... H02S 50/10; H02S 40/38; G05B 23/0221; G05B 23/0235; G05B 23/0232;
(Continued)

(56) References Cited

U.S. PATENT DOCUMENTS

2012/0083933 A1* 4/2012 Subbu ................. G06N 3/02
700/291
2017/0070081 A1 3/2017 Cher et al.
(Continued)

FOREIGN PATENT DOCUMENTS

JP 2014154728 A 8/2014
JP 2014155318 A 8/2014
(Continued)

*Primary Examiner* — Santosh R Poudel
(74) *Attorney, Agent, or Firm* — GOLDILOCKS ZONE IP LAW

(57) ABSTRACT

The present disclosure relates to an apparatus for diagnosing a state of a photovoltaic device, a building Integrated Photovoltaics (BIPV) device, etc., and more particularly to an apparatus for diagnosing photovoltaic power generation, which diagnoses a state of the specific photovoltaic device by comparing the difference in power generation between grouped photovoltaic devices through analysis of power generation for the same period in the past through machine learning, etc., wherein the apparatus processes power generation information, which is collected from the photovoltaic devices, based on failure history and maintenance and repair information of each photovoltaic device and performs precise grouping by minimizing error information regarding a power generation trend based on information such as regional weather information and environment information for a region where each photovoltaic device is located, so that a power generation trend can be analyzed with improved accuracy of analysis of state.

7 Claims, 3 Drawing Sheets

(58) Field of Classification Search
CPC .... G05B 23/0237; Y02A 30/60; Y02B 10/10; Y02E 10/50
See application file for complete search history.

(56) References Cited

U.S. PATENT DOCUMENTS

2018/0041042 A1* 2/2018 Maki .......................... G05F 1/67
2019/0148945 A1* 5/2019 Nakayama ................ H02J 3/00
700/291

FOREIGN PATENT DOCUMENTS

| JP | 2016134930 A | * | 7/2016 |
| KR | 101728692 B1 | | 4/2017 |
| KR | 10-1743485 B1 | * | 6/2017 |
| WO | WO-2016085008 A1 | * | 6/2016 |
| WO | 2018202353 A1 | | 11/2018 |

* cited by examiner

APPARATUS FOR DIAGNOSING PHOTOVOLTAIC POWER GENERATION THROUGH ANALYSIS OF POWER GENERATION TREND

CROSS-REFERENCE TO RELATED APPLICATIONS

This application claims the benefit under 35 U.S.C. section 371, of PCT International Application No.: PCT/KR2019/017300, filed on Dec. 9, 2019, which claims foreign priority to Korean Patent Application No.: KR10-2019-0017759, filed on Feb. 15, 2019, in the Korean Intellectual Property Office, both of which are hereby incorporated by reference in their entireties.

TECHNICAL FIELD

The present disclosure relates to an apparatus for diagnosing a state of a photovoltaic device, a building Integrated Photovoltaics (BIPV) device, etc., and more particularly to an apparatus for diagnosing photovoltaic power generation, the apparatus that does not perform diagnosis based on comparison between predicted power generation of a specific photovoltaic device and actual power generation, and which diagnoses a state of the specific photovoltaic device by comparing the difference in power generation between grouped photovoltaic devices through analysis of power generation for the same period in the past through machine learning, etc., wherein the apparatus processes power generation information, which is collected from the photovoltaic devices, based on failure history and maintenance and repair information of each photovoltaic device and performs precise grouping by minimizing error information regarding a power generation trend based on information such as regional weather information and environment information for a region where each photovoltaic device is located, so that a power generation trend can be analyzed with improved accuracy of analysis of state.

BACKGROUND ART

Solar photovoltaic power generation, which is a field of new and renewable energy, has recently been rapidly increasing in demand due to its many advantages, and technologies to increase power generation efficiency have been developed. When these photovoltaic devices fail to produce normal power generation output from photovoltaic modules due to various reasons such as shading, failure, aging, etc. in operation processes, the importance of maintenance to quickly diagnose and respond to these reasons is increasing.

These existing technologies for diagnosing a failure of solar photovoltaic power generation suggests a concept, which calculates predicted power generation using various prediction techniques in consideration of various environmental factors in a corresponding photovoltaic equipment (or module) and, in response to actual power generation out of a predetermined range from the predicted power generation, determines an abnormality and cause precise diagnosis and maintenance to be performed. Since various factors for solar photovoltaic power generation cannot be precisely reflected, the predicted power generation is not accurate enough. Therefore, the technique of diagnosing a failure based on predicted power generation with a large error range has a limitation that a rate of false diagnosis rate increases.

<Patent Literature> Korean Patent No. 10-1728692 "SYSTEM AND METHOD OF PREDICTING AND MONITORING ANOMALITY OF PHOTOVOLTAIC MODULE"

The related art disclosed in the <Patent Literature> also calculates real-time predicted power generation of a photovoltaic module based on data such as an existing change trend and solar radiation information of the photovoltaic module and then determine a failure of the photovoltaic module based on a degree of correspondence between the predicted power generation and actual power generation, that is, a difference therebetween, and therefore, the related art still has the same problem that a diagnosis error is large.

Accordingly, there is increasing need for devices and technologies capable of accurately diagnosing and responding to a state of solar power generation for efficiency of maintenance of solar power generation.

DISCLOSURE

Technical Problem

The present disclosure was devised to solve the above problems.

An aspect of the present disclosure is to provide an apparatus for diagnosing a photovoltaic device, the apparatus which does not perform diagnosis based on comparison between predicted power generation of a specific photovoltaic device and actual power generation, and which diagnoses a state of the specific photovoltaic device by comparing the difference in power generation between grouped photovoltaic devices through analysis of power generation for the same period in the past through machine learning, etc., so that accuracy of diagnosis of state is improved.

Another aspect of the present disclosure is to provide an apparatus for diagnosing a photovoltaic device, the apparatus which processes power generation information, which is collected from photovoltaic devices, based on failure history and maintenance and repair information of each photovoltaic device and performs precise grouping by minimizing error information regarding a power generation trend based on information such as regional weather information and environment information for a region where each photovoltaic device is located, so that precise grouping is enabled and hence accuracy of diagnosis of state is improved.

Yet another aspect of the present disclosure is to provide an apparatus for diagnosing photovoltaic power generation, the apparatus which receives a final result of an abnormality as to a diagnosed photovoltaic device and reflects the final result to modify information from a power generation data processing module or a power generation data cleansing module and perform regrouping, so that accuracy of diagnosis of state is improved.

Yet another aspect of the present disclosure is to provide an apparatus for diagnosing photovoltaic power generation, the apparatus which performs precise grouping of photovoltaic devices by a grouping criteria that is selected from among a trend of daily cumulative power generation for a predetermined period, a trend of average power generation for the predetermined period, and a trend of maximum daily power generation compared to an installed capacity for the predetermined period.

Yet another aspect of the present disclosure is to provide an apparatus for diagnosing photovoltaic power generation, the apparatus which provides a power balancing device to allow a photovoltaic device, which is diagnosed as abnormal, to generate optimal photovoltaic power generation before maintenance such as cleaning and replacement, wherein the power balancing device is not limited to a method of compensating with low power for a difference in power generated between series circuits (strings) constituting a solar panel (array) and the power balancing device balances generated power between the strings in a manner of minimizing or eliminating a power deviation between the strings, thereby enhancing efficiency of photovoltaic power generation.

Technical Solution

In order to achieve the above goals, the present disclosure is realized by embodiments having the following configuration.

According to an aspect of the present disclosure, there is provided an apparatus for diagnosing photovoltaic power generation through analysis of a power generation trend, the apparatus including: a photovoltaic device configured to generate power using sunlight; and a diagnostic server configured to diagnose a state of the photovoltaic device based on power generation data transmitted from the photovoltaic device. The diagnostic server may be further configured to group photovoltaic devices similar in power generation trends for a same period in the past, and diagnose a specific photovoltaic device by comparing a difference in power generation of a corresponding group.

According to another aspect of the present disclosure, the diagnostic server may include: a grouping unit configured to group photovoltaic devices similar in power generation trends for the same period in the past among the entire photovoltaic devices; and an abnormality diagnosis unit configured to select a specific photovoltaic device with power generation out of an error range among the grouped photovoltaic devices.

According to yet another aspect of the present disclosure, wherein the grouping unit may include: a power generation data collection module configured to collect information such as previous daily power generation and a daily power generation deviation from the photovoltaic devices; a power generation data processing module configured to process information collected by the power generation data collection module based on information such as failure history and maintenance history of each of the photovoltaic devices; a power generation data cleansing module configured to minimize error information regarding a power generation trend based on information such as regional weather information and environmental information for a region in which each of the photovoltaic devices is located; and a grouping module configured to group the photovoltaic devices by applying a grouping algorithm to data calculated by the power generation data cleansing module. The abnormality diagnosis unit may include: an abnormality diagnosis module configured to diagnose an abnormality by calculating an error range for a photovoltaic device in a corresponding group based on a grouping criteria applied by the grouping module; and a diagnosis accuracy review module configured to provide a final result of the abnormality in the photovoltaic device by the abnormality diagnostic module.

According to yet another aspect of the present disclosure, the grouping unit may further include a grouping modification module configured to modify information from the power generation data processing module or the power generation data cleansing module by reflecting the final result provided by the diagnosis accuracy review module and regroup the photovoltaic devices.

According to yet another aspect of the present disclosure, the grouping module may be further configured to group the photovoltaic devices by a criteria that is selected from among a trend of daily cumulative power generation for a predetermined period, a trend of average power generation for the predetermined period, and a trend of maximum daily power generation compared to an installed capacity for the predetermined period.

According to yet another aspect of the present disclosure, the apparatus may further include a power balancing unit connected to each of a plurality of strings in an array of each photovoltaic device and configured to minimize a power deviation between the strings due to a shading or a failure in a specific module when an abnormality occurs in a corresponding photovoltaic device.

According to yet another aspect of the present disclosure, the power balancing unit may include: a measurement unit configured to measure a current or voltage for each of the plurality of strings; an Energy Storage System (ESS) unit configured to perform power compensation or power absorption with respect to each of the plurality of strings; and a controller configured to store the ESS unit based on data from the measurement unit. The controller may include: an ESS state determination module configured to determine an ESS charge capacity of the ESS unit; an ESS control module configured to determine whether to discharge or charge the ESS unit according to the ESS charge capacity of the ESS unit, which is determined by the ESS state determination module; and a string-ESS connection module configured to determine a string subject to power compensation or power absorption according to the determination made by the ESS control module as to whether to charge or discharge the ESS unit and connect the determined string to the ESS unit.

According to yet another aspect of the present disclosure, the ESS control module may include: an ESS discharge control module configured to, when the ESS charge capacity of the ESS unit is sufficient, discharge the ESS unit to perform power compensation with respect to a string with output power reduced; and an ESS charge control module configured to, when the ESS charge capacity of the ESS unit is insufficient, charge the ESS unit to perform power absorption with respect to a string with high output power, so that a power deviation between the strings is minimized.

According to yet another aspect of the present disclosure, the string-ESS connection module may include: a power compensation connection module configured to, when the ESS discharge control module discharges the ESS unit, specify a string with output power reduced among the plurality of strings and connect the specified string to the ESS; and a power absorption connection module configured to, when the ESS charge control module charges the ESS unit, connect a string with high output power among the plurality of strings to the ESS.

Advantageous Effects

The present disclosure can achieve the following effects according to the above embodiments, configuration, combination, and use relationship described below.

The present disclosure has an effect of improving accuracy of diagnosis of state not by performing diagnosis based on comparison between predicted power generation of a specific photovoltaic device and actual power generation, but by diagnosing a state of the specific photovoltaic device by comparing the difference in power generation between grouped photovoltaic devices through analysis of power generation for the same period in the past through machine learning, etc.

The present disclosure has an effect of enabling precise grouping and improving accuracy of diagnosis of state by processing power generation information, which is collected from photovoltaic devices, based on failure history and maintenance and repair information of each photovoltaic device and by performing precise grouping by minimizing error information regarding a power generation trend based on information such as regional weather information and environment information for a region where each photovoltaic device is located.

The present disclosure has an effect of improving accuracy of diagnosis of state by receiving a final result of an abnormality as to a diagnosed photovoltaic device and reflects the final result to modify information from a power generation data processing module or a power generation data cleansing module and performing regrouping.

The present disclosure has an effect of performing precise grouping of photovoltaic devices by a grouping criteria that is selected from among a trend of daily cumulative power generation for a predetermined period, a trend of average power generation for the predetermined period, and a trend of maximum daily power generation compared to an installed capacity for the predetermined period.

The present disclosure has an effect of providing a power balancing device to allow a photovoltaic device, which is diagnosed as abnormal, to generate optimal photovoltaic power generation before maintenance such as cleaning and replacement, wherein the power balancing device is not limited to a method of compensating with low power for a difference in power generated between series circuits (strings) constituting a solar panel (array) and the power balancing device balances generated power between the strings in a manner of minimizing or eliminating a power deviation between the strings, thereby enhancing efficiency of photovoltaic power generation.

DESCRIPTION OF DRAWINGS

The above and other aspects, features, and advantages of certain embodiments will be more apparent from the following detailed description taken in conjunction with the accompanying drawings, in which.

DESCRIPTION OF REFERENCE NUMERALS

Figure 1:
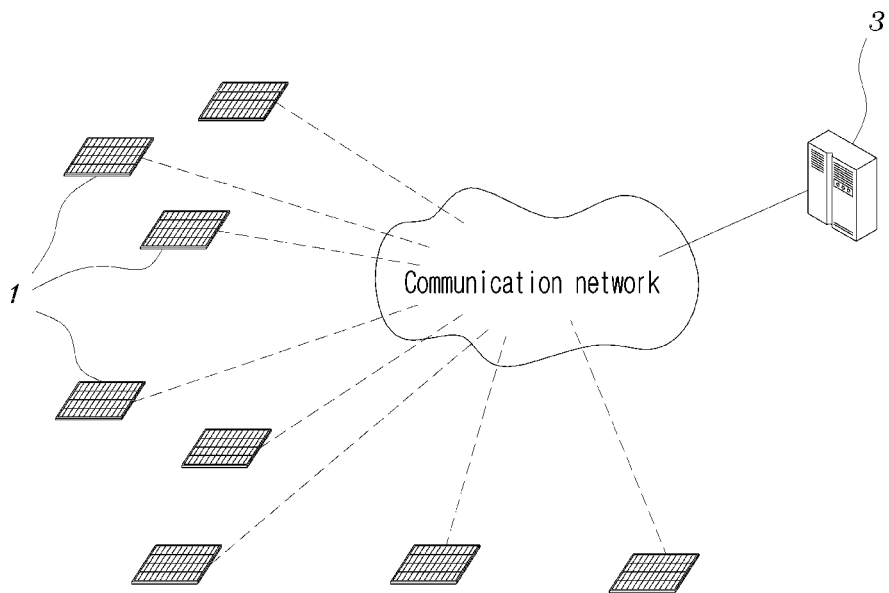
FIG. 1 is a conceptual diagram of a photovoltaic power generation diagnostic device according to the present disclosure.

1: photovoltaic device
11: photovoltaic module
12: string
13: array
14: inverter
15: connector
16: power balancing unit
161: measurement unit
1611: sensor
162: energy storage device (ESS) unit
163: controller
1631: ESS state determination module
1632: ESS control module
16321: ESS discharge control module
16322: ESS charge control module
1633: string-ESS connection module
16331: power compensation connection module
16332: power absorption connection module
3: diagnostic server
31: grouping unit
311: power generation data collection module
312: power generation data processing module
313: power generation data cleansing module
314: grouping module
315: grouping modification module
32: abnormality diagnosis unit
321: abnormality diagnosis module
322: diagnostic accuracy review module

BEST MODE

Hereinafter, preferred embodiments of an Energy Storage System (ESS) including a cooling function according to the present disclosure will be described in detail with reference to the accompanying drawings. In the following description of the embodiment of the present disclosure, a detailed description of known functions and configurations incorporated herein will be omitted as it may make the subject matter of the present disclosure unclear. In the specification, unless explicitly described to the contrary, the word "comprise" and variations such as "comprises" or "comprising", will be understood to imply the inclusion of stated elements but not the exclusion of any other elements, and the terms "unit" and "module" described in the specification indicate a unit for processing at least one function or operation, which may be implemented by hardware, software or a combination thereof.

Figure 2:
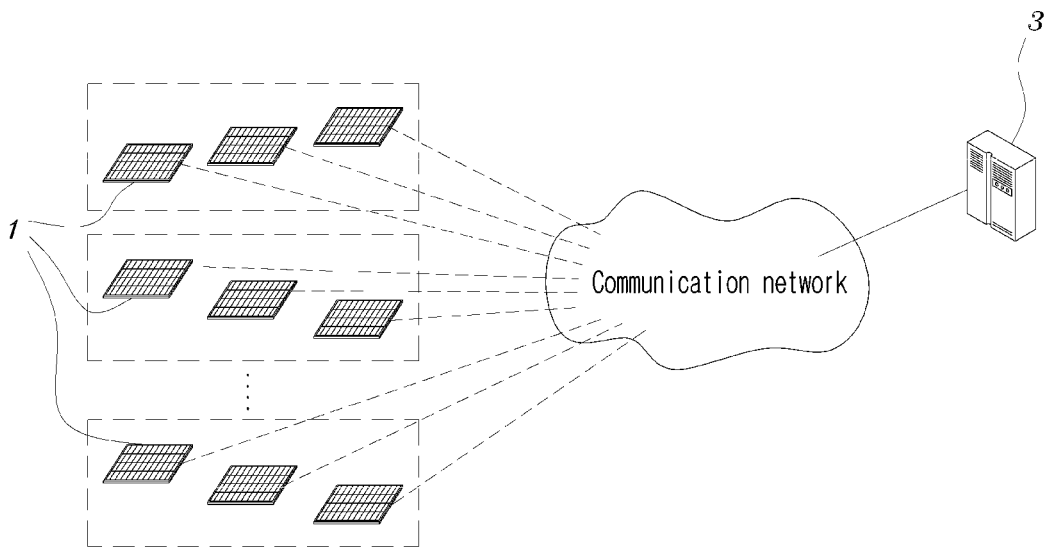
FIG. 2 is a diagram illustrating a state of performing diagnosis by grouping photovoltaic devices in the present disclosure.
Figure 3:
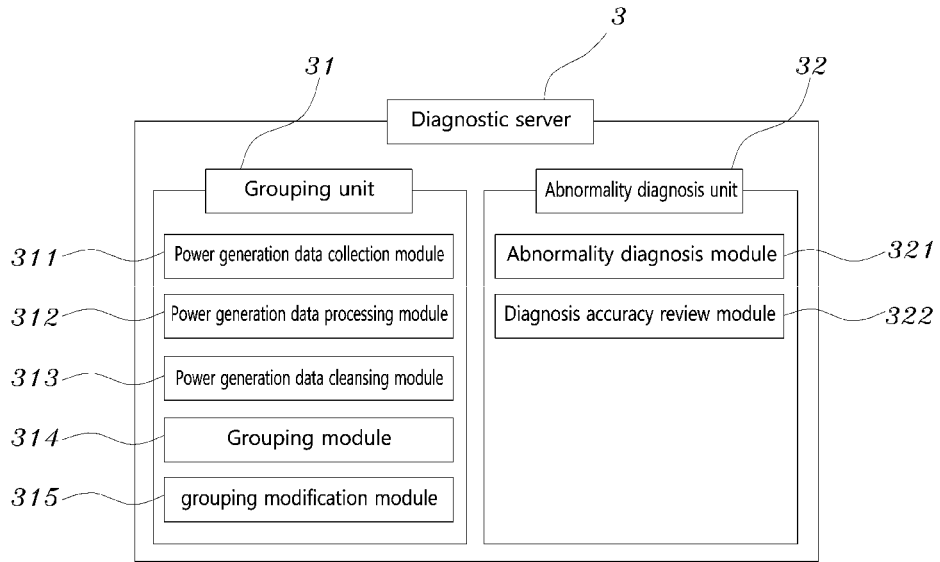
FIG. 3 is a diagram illustrating a configuration of a diagnostic server included in a diagnostic apparatus of the present disclosure.

Referring to FIGS. 1 to 3, an apparatus for diagnosing photovoltaic power generation based on power generation trend according to an embodiment of the present disclosure may include a photovoltaic device 1 which generates power using sunlight, and a diagnostic server 3 which diagnoses a state of the photovoltaic device 1 based on data on a generated power data, which is transmitted from the photovoltaic device 1, and the diagnostic server 3 may group photovoltaic devices 1 similar in power generation trends for the same period in the past, and diagnose a state of a specific photovoltaic device 1 by comparing the power generation in the group.

The photovoltaic device 1 is a device that generates electrical energy using sunlight (light energy). A string 12 and an array 13 may be formed by gathering a minimum unit of photovoltaic modules 11, and the arrays 13, which is generally so called a solar panel, may be grouped to form the photovoltaic device 1. In the present disclosure, the photovoltaic device 1 refers not only to a photovoltaic power plant installed on the ground, but also to various types of photovoltaic devices 1 installed on a building rooftop, on a water surface, a building outer wall, and the like, such as a building-integrated photovoltaic device (BIPV).

The diagnostic server 3 is configured to diagnose a state of the photovoltaic device 1 based on power generation data transmitted from the photovoltaic device 1, and the present disclosure may provide a distinctive diagnostic function, different from a related art, using a configuration (function) of the diagnostic server 3. That is, as mentioned above as a problem of the prior art, predicted power generation is conventionally calculated using various prediction techniques in consideration of various environmental factors, etc. in a photovoltaic equipment (or module), and, If actual power generation exceeded a certain range compared to the predicted power generation, it is determined as abnormal and precise diagnosis or maintenance are performed. Due to the limitation that various factors affecting photovoltaic power generation cannot be accurately reflected, the predicted power generation is not accurate enough. A failure diagnosis technology based on the predicted power generation with a large error range also has a limitation that a false diagnosis rate increases. In the present disclosure, a state of a specific photovoltaic device 1 is diagnosed using the diagnostic server 3 by comparing a difference in power generation of grouped photovoltaic devices 1 (see FIG. 2) through analysis of a power generation trend for the same period in the past, and therefore, accuracy of the analysis of the state may improve. To this end, the diagnostic server 3 may include a grouping unit 31 for grouping photovoltaic devices 1 similar in power generation trends for the same period in the past among the entire photovoltaic devices 1, and an abnormality diagnosis unit 32 for selecting a specific photovoltaic device 1 with power generation out of an error range among the grouped photovoltaic devices 1.

The grouping unit 31 is configured to group photovoltaic devices 1 similar in power generation trends for the same period in the past among the entire photovoltaic devices 1 (see FIG. 2). Preferably, the grouping unit 31 may group photovoltaic devices 1 similar in power generation trends based on data on power generation for the same period in the past by using machine learning by which artificial intelligence is implemented in software. More specifically, the grouping unit 31 may include a power generation data collection module 311 for collecting information such as previous daily power generation and a daily power generation deviation from the photovoltaic devices 1, a power generation data processing module 312 for processing information collected by the power generation data collection module 311 based on information such as failure history and maintenance history of each photovoltaic device 1, a power generation data cleansing module 313 for minimizing error information regarding a power generation trend based on information such as regional weather information and environmental information for a region in which each photovoltaic device 1 is located, a grouping module 314 for grouping the photovoltaic devices 1 by applying a grouping algorithm to data calculated by the power generation data cleansing module 313.

The power generation data collection module 311 is configured to collect information such as a previous daily power generation and a daily power generation deviation from the photovoltaic devices 1. The power generation data collection module 311 may collect and data basic information for the respective photovoltaic devices 1 in order to grouping the photovoltaic devices 1. To this end, the power generation data collection module 311 may be connected with the photovoltaic devices 1 using wired or wireless communication.

The power generation data processing module 312 is configured to process information collected by the power generation data collection module 311 based on information such as failure history and maintenance history of each photovoltaic device 1. That is, even in the case where information indicating that power generation of a specific photovoltaic device 1 was dramatically reduced in a specific period is collected (by the power generation data collection module 311), if a part or most of the corresponding photovoltaic device 1 went through maintenance in the specific period for the reason of a regular inspection or a failure, the power generation data processing module 312 may modify and process power generation information of the specific photovoltaic device 1 by reflecting the maintenance and obtain accurate power generation trend information regarding the specific photovoltaic device 1. To this end, the power generation data processing module 312 may collect and manage information such as failure history and maintenance history for each photovoltaic device 1.

The power generation data cleansing module 313 is configured to minimize error information regarding a power generation trend based on information such as regional weather information and environmental information for a region in which each photovoltaic device 1 is located. That is, although the photovoltaic devices 1 exhibit similar power generation over a specific period, if there is a difference in environment where the corresponding photovoltaic devices 1 are located, that is, a difference in daily solar radiation, temperature, humidity, or the like and such photovoltaic devices 1 exhibiting the similar power generation are grouped, it may deteriorate reliability of a result of the grouping. Therefore, by reflecting information such as regional weather information and environment information for a region in which each photovoltaic device 1 is located, in addition to the information provided by the power generation data collection module 311 to the power generation data processing module 312, the power generation data cleansing module 313 may minimize error information regarding a power generation trend of each photovoltaic device 1, whereby the grouping module 315 which will be described later is allowed to perform reliable grouping.

The grouping module 314 is configured to group photovoltaic devices 1 similar in power generation trends by applying a grouping algorithm (a program for grouping by a grouping criteria) to data calculated by the power generation data cleansing module 313.

As an example, the grouping module 314 may perform grouping photovoltaic devices 1 most similar in daily deviations based on daily cumulative power generation data for the respective photovoltaic devices 1 for a predetermined period of time. That is, photovoltaic devices 1 most similar in daily power generation patterns are grouped by reflecting environment information or maintenance history information of each photovoltaic device 1, so if one of the photovoltaic devices 1 in the group has a daily power generation pattern out of an error range unlike other photovoltaic devices 1, the abnormality diagnosis unit 32 which will be described later may diagnose whether there is an abnormality.

As another example, the grouping module 314 may group photovoltaic devices 1 most similar in average power generation rates based on average power generation rate trend (data) for photovoltaic devices 1 for a predetermined period. That is, photovoltaic devices 1 exhibiting the most similar power generation patterns (trends) for the predetermined period are grouped, and, if one of the grouped photovoltaic devices 1 exhibits a previous day's power generation out of an error range from the average power generation rates unlike other photovoltaic devices 1, the abnormality diagnosis unit 32 which will be described later may diagnose whether there is an abnormality.

As another example, based on a daily maximum power generation trend (data) compared to an installed capacity for a predetermined period, the grouping module 314 may group photovoltaic devices 1 most similar in daily maximum power generation deviations in consideration of the installed capacity. That is, the grouping may be performed based on data for a shortest period compared to cumulative data or average data, and if a maximum power generation deviation of a specific photovoltaic device 1 falls out of an error range compared to other photovoltaic devices 1 in the same group, the abnormality diagnosis unit 32 which will be described later may diagnose an abnormality, and therefore, it is possible to perform diagnosis relatively quickly.

The abnormality diagnosis unit 32 is configured to select a specific photovoltaic device 1 with power generation out of an error range among the grouped photovoltaic devices 1. More specifically, the abnormality diagnosis unit 32 may include an abnormality diagnosis module 321 which diagnoses an abnormality by calculating an error range for a photovoltaic device 1 in a corresponding group based on a grouping criteria applied by the grouping module 314, and a diagnosis accuracy review module 322 which provides a final result of the abnormality in the photovoltaic device diagnosed by the abnormality diagnosis module 321.

The abnormality diagnosis module 321 is configured to diagnose an abnormality by calculating an error range for a photovoltaic device 1 in a corresponding group based on a grouping criteria applied by the grouping module 314. That is, if the grouping criteria for grouped photovoltaic devices 1 is a daily cumulative power generation trend, the abnormality diagnosis module 321 may diagnose that a photovoltaic device 1 having a previous day's power generation deviation out of an error range compared to other photovoltaic devices 1 in the same group is in an abnormal state. If the grouping criteria is an average power generation rate, the abnormality diagnosis module 321 may diagnose that a photovoltaic device 1 having a previous day's power generation rate deviation out of an error range with respect to other photovoltaic devices 1 in the same group is in an abnormal state. If the grouping criteria is a daily maximum power generation with respect to an installed capacity, the abnormality diagnosis module 321 may diagnose that a photovoltaic device 1 having a previous day maximum power generation deviation out of an error range with respect to other photovoltaic devices in the same group is in an abnormal state.

The diagnosis accuracy review module 322 is configured to provide a final result of an abnormality in a photovoltaic device 1 diagnosed by the abnormality diagnosis module 321. For accuracy of diagnosis by the diagnostic device, the diagnosis accuracy review module 322 may compare a result of diagnosis by the abnormality diagnosis module 321 with an actual result. In order to modify and update a grouping criteria or a discriminate algorithm to perform grouping later or perform grouping in response to diagnosis of an abnormality, the diagnosis accuracy review module 322 may provide a final result of an abnormality in a photovoltaic device 1.

Meanwhile, the grouping unit 31 may further include a grouping modifying module 315, which modifies information from the power generation data processing module 312 or the power generation data cleansing module 313 by reflecting a feedback result provided from the diagnosis accuracy review module 322 and regroups photovoltaic devices 1. That is, the grouping modification module 315 may reflect data on a case where a diagnosis result is different from an actual result to the power generation data processing module 312 or the power generation data cleansing module 313 to enhance accuracy of data processing for grouping or may modify or update the grouping criteria applied by the grouping module 314 to regroup the already grouped photovoltaic devices 1 to enhance accuracy of diagnosis.

In another embodiment of the present disclosure, a power balancing device may be further included to enable a photovoltaic device 1 diagnosed as an abnormal state to perform optimal photovoltaic power generation even before maintenance such as cleaning and replacement. In this case, the power balancing device to be provided in the present disclosure is not limited to a method of compensating with low power for a difference in power generated between series circuits (strings) constituting a solar panel (array) as in a related art, but the power balancing device balances generated power between the strings in a manner of minimizing or eliminating a power deviation between the strings. This will be described in more detail in the following.

Figure 4:
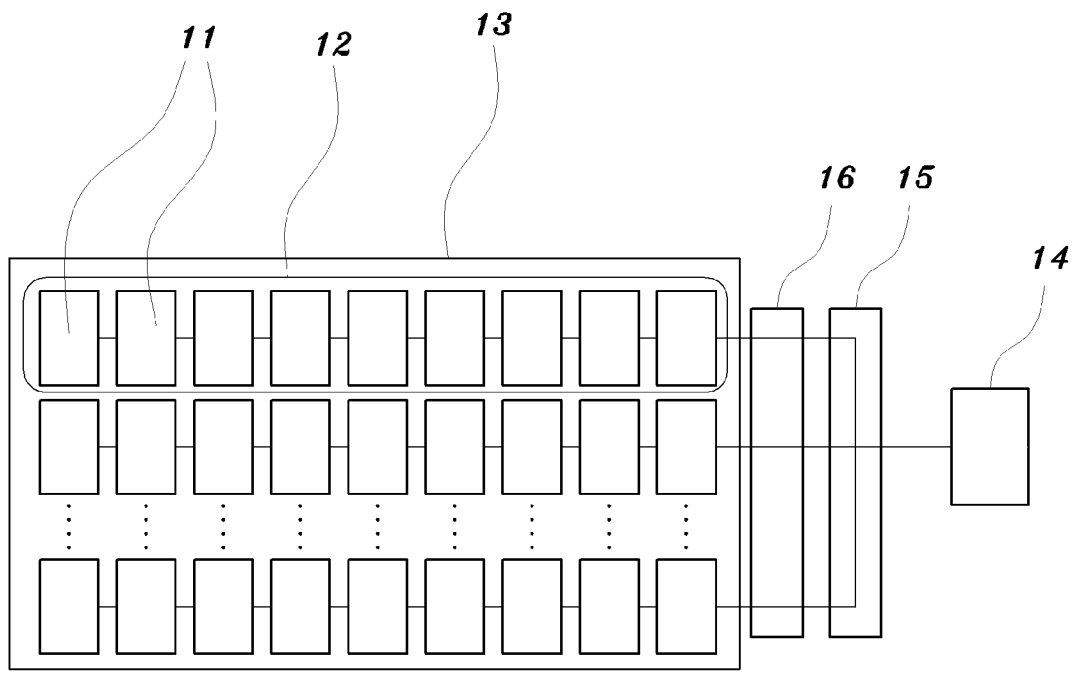
FIG. 4 is a conceptual diagram including a power balancer in a photovoltaic device of the present disclosure.
Figure 5:
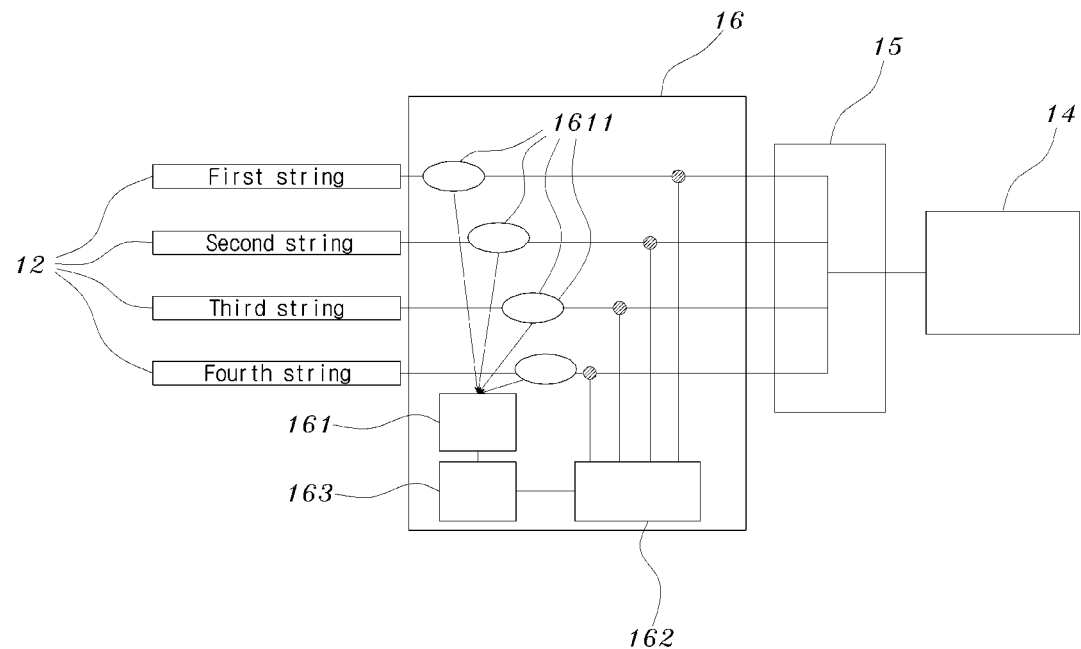
FIG. 5 is a diagram illustrating a detailed configuration of a power balancer applied to the present disclosure.
Figure 6:
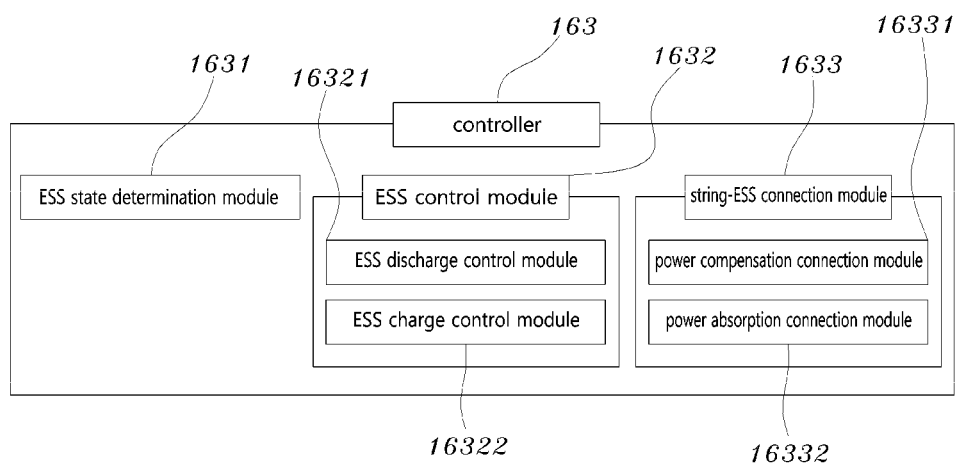
FIG. 6 is a block diagram illustrating a detailed configuration of a controller included in a power balancer.

Referring to FIGS. 4 to 6, in another embodiment of the present disclosure, the photovoltaic diagnosis device may further include a power balancing unit 16 connected to each of a plurality of strings 12 in an array 13 of each photovoltaic device 1 to minimize a power deviation between the strings 12 due to a shading or a failure in a specific photovoltaic module 11 when an abnormality occurs in a corresponding photovoltaic device 1. (For reference, a string 12 forming a serial circuit with photovoltaic modules 11 connected in series, an array 13 connected with a plurality of string 12 in parallel, an inverter 14 for converting DC power generated using sunlight into AC power and supplying the AC power to a receiver, and a connector 15 for facilitating connection between the array 13 and the inverter 14 and performing various protection functions are well-known configurations of a photovoltaic device and thus a detailed description thereof will be omitted.)

The power balancing unit 16 is connected to each of the plurality of strings 12 and configured to minimize a power deviation between the strings 12 due to a shading or a failure in a specific module. To this end, the power balancing unit 16 may include a measurement unit 161 for measuring an output current or voltage from each of the plurality of strings 12, an Energy Storage System (ESS) unit 162 for performing power compensation or power absorption with respect to each of the plurality of strings 12, and a controller 163 for controlling the ESS unit 162 based on data from the measurement unit 161.

The measurement unit 161 is configured to measure an output current or voltage from each of the plurality of strings 12. To this end, the measurement unit 161 may measure an output current and/or voltage from each of the plurality of strings 12 through sensors 1611 respectively installed in the plurality of strings 12 and transmit information on output power from each string 12 to the controller 163. As in the example shown in FIG. 5, the sensors 1611 each may be formed as a current and/or voltage sensor installed at an end of the plurality of strings 12 in order to measure a current and/or voltage output from each of the plurality of strings 12, and the measurement unit 161 may transmit the information on output power from each of the plurality of strings 12 to the controller 163 based on information transmitted from the sensors 1611. Through the information measured and transmitted by the measurement unit 161, it is possible to identify an amount of output power from each string 12, such as whether power in a normal state is generated and output from each string 12 or whether power in an amount reduced due to a failure or a shading in a specific photovoltaic module 11 is output from a specific string 12.

The ESS unit 162 is configured to perform power compensation or power absorption with respect to each of the plurality of strings 12. To this end, an ESS capable of charging and discharging power may be connected to each of the plurality of strings 12 to perform power compensation or power absoprtion with respect to a specific string 12, thereby minimizing or eliminating a power deviation between the parallel-connected strings 12 constituting an array 13.

The controller 163 is configured to control the ESS unit 162 based on data from the measurement unit 161. As mentioned above as a problem of a related art, in the case of the related art that supplies compensative power through a power compensating device only to a string with power generation reduced due to a shading or a failure in a specific module, it is necessary to pre-store power in a separate ESS in order to compensate for power of the corresponding string, and accordingly, in a facility which outputs a large amount of photovoltaic power, a large-capacity ESS for power compensation is required (for example, if compensation is performed with power generation of 10 kW for one hour, a battery capacity of 10 kWh needs to be charged, and, in order to prepare for the case where the amount and time of decrease in power generation relatively increases, an ESS with a battery capacity larger than a photovoltaic capacity needs to be provided for power compensation.) In this case, there are problems that costs and economic efficiency are significantly reduced and that a system connection or configuration (a compensation photovoltaic panel and the like) for charging the separate ESS is required. The present disclosure does not just address the problems by compensating for power for a string 12 of which output power is reduced, but also provide a solution in a manner of minimizing or eliminating a power deviation between the respective strings 12 in consideration of an array 13 as a whole. To this end, the controller 163 may include: an ESS state determination module 1631 for determining an ESS charge capacity of the ESS unit 162, an ESS control module 1632 for determining whether to discharge or charge the ESS unit 162 according to the ESS charge capacity of the ESS unit 162, which is determined by the ESS state determination module 1631, and a string-ESS connection module 1633 for determining a string 12 subject to power compensation or power absorption according to the determination made by the ESS control module 1632 as to whether to charge or discharge the ESS unit and connecting the string 12 to an ESS. That is, in order to minimize a power deviation between the strings 12, in the case where an ESS connected to an end of each string 12 has a sufficient charge capacity, compensation power may be supplied from the ESS to a string 12 with output power reduced (that is, the ESS is discharged) to increase power of the corresponding string 12, thereby eliminating a power deviation between the entire strings 12. Conversely, in the case where an ESS connected to an end of each string 12 has an insufficient charge capacity, power may be absorbed into the ESS from strings 12 with high output power (that is, the ESS is charged) to reduce power of the corresponding strings 12, thereby eliminating a power deviation between the entire strings 12. Accordingly, since the ESS is not in a structure in which compensation power is required to be continuously supplied, the ESS does not necessarily have a large capacity. In addition, since charging and discharging of the ESS is performed in a corresponding array 13, a separate system or configuration only for charging the ESS is not required.

The ESS state determination module 1631 is configured to determine an ESS charge capacity of the ESS unit 162. If information on whether a charge capacity of the ESS is sufficient to supply compensation power is provided through the ESS state determination module 1631, the ESS control module 1632 which will be described later may determine whether to discharge or charge the ESS unit.

The ESS control module 1632 is configured to determine whether to discharge or charge the ESS unit according to an ESS charge capacity of the ESS unit 162, which is determined by the ESS state determination module 1631. To this end, the ESS control module 1632 may include an ESS discharge control module 16321 for, when the ESS charge capacity of the ESS unit 162 is sufficient, discharging the ESS unit to compensate for power of a string 12 with output power reduced, and an ESS charge control module 16322 for, when the ESS charge capacity of the ESS unit 162 is insufficient, charging the ESS unit to absorb power from a string 12 with high output power, thereby minimizing a power deviation between strings 12.

The ESS discharge control module 16321 is configured to, when the ESS charge capacity of the ESS unit 162 determined by the ESS state determination module 1631 is sufficient, discharge the ESS unit to compensate for power to a string 12 with output power reduced. When the ESS discharge control module 16321 determines a control to discharge the ESS unit to compensate for power of the string 12 with output power reduced to minimize a power deviation between the entire strings 12, the string-ESS connection module 1633 which will be described later may determine a string 12 subject to power compensation and connect the string 12 to the ESS, so that the control by the ESS discharge control module 16321 can be performed smoothly.

The ESS charge control module 16322 is configured to, when the ESS charge capacity of the ESS unit 162 determined by the ESS state determination module 1631 is insufficient, charge the ESS unit to absorb power from a string 12 with high output power. When the ESS charge control module 16322 determines a control to charge the ESS unit to absorb power from a string 12 with high output power to thereby minimize a power deviation between the entire strings 12, the string-ESS connection module 1633 which will be described later may determine a string subject to power absorption and connect the string to the ESS, so that the control by the ESS charge control module 16322 can be performed smoothly.

The string-ESS connection module 1633 is configured to determine a string 12 subject to power compensation or power absorption according to a determination whether to charge or discharge by the ESS control module 1632, and connect the determined string 12 to the ESS. To this end, the string-ESS connection module 1633 may include a power compensation connection module 16331 configured to, when the ESS discharge control module 16321 discharges the ESS unit 162, specify a string 12 with output power reduced among the plurality of strings 12 and connect the string 12 to the ESS, and a power absorption connection module 16332 configured to, when the ESS charge control module 16322 charges the ESS unit 162, connect a string 12 with high output power among the plurality of strings 12 to the ESS.

The power compensation connection module 16331 is configured to, when the ESS discharge control module 16321 discharges the ESS unit 162, specify a string 12 with output power reduced among a plurality of strings 12. For example, referring to FIG. 5, suppose that output power from a first string 12 is reduced due to a shading or a failure in a specific photovoltaic module 11 and remaining second to fourth strings 12 generates normal output power, and that an ESS charge capacity of the ESS unit 162, which is determined by the ESS state determination module 1631, is sufficient. In this case, when the ESS discharge control module 16321 determines a control to discharge the ESS unit 162 to compensate for the first string 12 with output power reduced, the power compensation connection module 16331 may connect the first string 12 with output power reduced to the ESS, so that compensation power can be provided from the ESS to the first string 12 to thereby minimize a power deviation between the entire strings 12.

The power absorption connection module 16332 is configured to, when the ESS charge control module 16322 charges the ESS unit 162, connect a string 12 with high output power among the plurality of strings 12 to the ESS. For example, referring to FIG. 5, suppose that output power from the first string 12 is reduced due to a shading or a failure in a specific photovoltaic module 11 and normal output power is output from other remaining second to fourth strings 12, and that an ESS charge capacity of the ESS unit 162, which is determined by the ESS state determination module 1631 is insufficient. In this case, when the ESS charge control module 16322 determines a control to charge the ESS unit to absorb power from the second to fourth strings 12 with high output power, the power absorption connection module 16332 may connect the second to fourth strings 12 with high output power to the ESS, so that the ESS is discharged by absorbing power from the second to fourth strings 12 to thereby minimize a power deviation between the entire strings.

As described above, when it comes to the power balancing unit 16 according to the present disclosure, in the case where the ESS connected to an end of each string 12 has a sufficient charge capacity, compensation power may be supplied from the ESS to a string 12 with output power reduced (that is, the ESS is discharged) to increase power of the corresponding string 12, thereby eliminating a power deviation between the entire strings 12. Conversely, in the case where the ESS connected to an end of each string 12 has an insufficient charge capacity, power may be absorbed into the ESS from strings with high output power (that is, the ESS is charged) to reduce power of the corresponding strings 12, thereby eliminating a power deviation between the entire strings 12. Accordingly, since the ESS is not in a structure in which compensation power is required to be continuously supplied, the ESS does not necessarily have a large capacity. In addition, since charging and discharging of the ESS is performed in a corresponding array 13, a separate system or configuration only for charging the ESS is not required. Further, since charging and discharging is performed without power conversion, this may improve efficiency.

Although the Applicant(s) have described various embodiments, the embodiments are only an example to achieve the technical spirit of the present disclosure and thus, it would be appreciated by those skilled in the art that changes or modifications may be made to the embodiments without departing from the principles and spirit of the present disclosure, the scope of which is defined by the claims and their equivalents.

The invention claimed is:

1. An system for diagnosing photovoltaic power generation through analysis of a power generation trend, the apparatus comprising:
a photovoltaic device configured to generate power using sunlight; and
a diagnostic server configured to diagnose a state of the photovoltaic device based on power generation data transmitted from the photovoltaic device, wherein the diagnostic server comprises:
  a grouping unit configured to group photovoltaic devices similar in power generation trends for the same period in the past among the entire photovoltaic devices; and
  an abnormality diagnosis unit configured to select a specific photovoltaic device with power generation out of an error range among the grouped photovoltaic devices
wherein the diagnostic server is further configured to group photovoltaic devices similar in power generation trends for a same period in the past, and diagnose a specific photovoltaic device by comparing a difference in power generation of a corresponding group,
  wherein the grouping unit comprises:
    a power generation data collection module configured to collect previous daily power generation information and a daily power generation deviation information from the photovoltaic devices;
    a power generation data processing module configured to process information collected by the power generation data collection module based on failure history information and maintenance history information of each of the photovoltaic devices;
    a power generation data cleansing module configured to minimize error information regarding a power generation trend based on regional weather information and environmental information for a region in which each of the photovoltaic devices is located; and
    a grouping module configured to group the photovoltaic devices by applying a grouping algorithm to data calculated by the power generation data cleansing module, and
  wherein the abnormality diagnosis unit comprises:
    an abnormality diagnosis module configured to diagnose an abnormality by calculating an error range for a photovoltaic device in a corresponding group based on a grouping criteria applied by the grouping module; and
    a diagnosis accuracy review module configured to provide a final result of the abnormality in the photovoltaic device diagnosed by the abnormality diagnostic module.

2. The apparatus of claim 1,
wherein the grouping unit further comprises a grouping modification module configured to modify information from the power generation data processing module or the power generation data cleansing module by reflecting the final result provided by the diagnosis accuracy review module and regroup the photovoltaic devices.

3. The apparatus of claim 1,
wherein the grouping module is further configured to group the photovoltaic devices by a criteria that is selected from among a trend of daily cumulative power generation for a predetermined period, a trend of average power generation for the predetermined period, and a trend of maximum daily power generation compared to an installed capacity for the predetermined period.

4. The apparatus of claim 1, further comprising:
a power balancing unit connected to each of a plurality of strings in an array of each photovoltaic device and configured to minimize a power deviation between the strings due to a shading or a failure in a specific module when an abnormality occurs in a corresponding photovoltaic device.

5. The apparatus of claim 4,
wherein the power balancing unit comprises:
  a measurement unit configured to measure a current or voltage for each of the plurality of strings;
  an Energy Storage System (ESS) unit configured to perform power compensation or power absorption with respect to each of the plurality of strings; and
  a controller configured to store the ESS unit based on data from the measurement unit,
wherein the controller comprises:
  an ESS state determination module configured to determine an ESS charge capacity of the ESS unit;
  an ESS control module configured to determine whether to discharge or charge the ESS unit according to the ESS charge capacity of the ESS unit, which is determined by the ESS state determination module; and
  a string-ESS connection module configured to determine a string subject to power compensation or power absorption according to the determination made by the ESS control module as to whether to charge or discharge the ESS unit and connect the determined string to the ESS unit.

6. The apparatus of claim 5,
wherein the ESS control module comprises:
  an ESS discharge control module configured to, when the ESS charge capacity of the ESS unit is sufficient, discharge the ESS unit to perform power compensation with respect to a string with output power reduced; and
  an ESS charge control module configured to, when the ESS charge capacity of the ESS unit is insufficient, charge the ESS unit to perform power absorption with respect to a string with high output power, so that a power deviation between the strings is minimized.

7. The apparatus of claim 6,
wherein the string-ESS connection module comprises:
  a power compensation connection module configured to, when the ESS discharge control module discharges the ESS unit, specify a string with output power reduced among the plurality of strings and connect the specified string to the ESS; and
  a power absorption connection module configured to, when the ESS charge control module charges the ESS unit, connect a string with high output power among the plurality of strings to the ESS.

* * * * *